(12) United States Patent
Ishibashi et al.

(10) Patent No.: US 6,342,194 B1
(45) Date of Patent: Jan. 29, 2002

(54) $NF_3$ TREATING PROCESS

(75) Inventors: Takayuki Ishibashi; Shinsuke Nakagawa, both of Yamaguchi (JP)

(73) Assignee: Central Glass Company, Limited, Ube (JP)

( * ) Notice: Subject to any disclaimer, the term of this patent is extended or adjusted under 35 U.S.C. 154(b) by 0 days.

(21) Appl. No.: 09/545,521

(22) Filed: Apr. 7, 2000

(30) Foreign Application Priority Data

Apr. 9, 1999 (JP) ............................................ 11-101997

(51) Int. Cl.⁷ .................................................. B01J 8/02
(52) U.S. Cl. .................... 423/342; 423/239.1; 423/406; 423/489
(58) Field of Search ............................ 423/240 R, 383, 423/239.1, 240 S, 489, 342, 406

(56) References Cited

U.S. PATENT DOCUMENTS 5,407,647 A    4/1995    Tarancom .................... 422/171

FOREIGN PATENT DOCUMENTS

| EP | 0 382 986 | 8/1990 | |
|----|-----------|--------|----|
| JP | 61-204025 | 9/1986 | |
| JP | 62-225228 | 10/1987 | |
| JP | 2-30731 | 7/1990 | |
| JP | 03063939 A | * 10/1993 | ........... B01D/53/34 |
| JP | 7-155540 | 6/1995 | |
| JP | 10-165764 | 6/1998 | |

OTHER PUBLICATIONS

Perry's Chemical Engineer' Handbook, 7th edition, pp. 18–10,11, 1999.*

* cited by examiner

*Primary Examiner*—Wayne Langel
*Assistant Examiner*—Maribel Medina Sanabria
(74) *Attorney, Agent, or Firm*—Crowell & Moring LLP

(57) ABSTRACT

A process for treating $NF_3$ useful as a dry etching gas and cleaning gas in processes for producing LSI, TFT, and solar cell and in an electron photographic processes. The treating process comprises following step: (a) preparing a reactor including agitator blades for agitating gas in the reactor and generating a flow of the gas, and a gas flow guide tube for efficiently circulating and dispersing the gas flow generated by the agitator blades in a space of the reactor; (b) stationarily placing at least one substance selected from the group consisting of a metal and a metal compound within a reactor, the metal being at least one metal selected from the group consisting of Si, B, W, Mo, V, Se, Te and Ge, the metal compound being at least one metal compound selected from the group consisting of solid compounds of Si, B, W, Mo, V, Se, Te and Ge: (c) introducing a gas containing $NF_3$ into the reactor to react the introduced gas with at least one substance of the metal and the metal compound at a temperature ranging from 400 to 900° C. upon operating the agitator blades of the reactor so as to form a fluoride gas; and (d) capturing the fluoride gas.

4 Claims, 1 Drawing Sheet

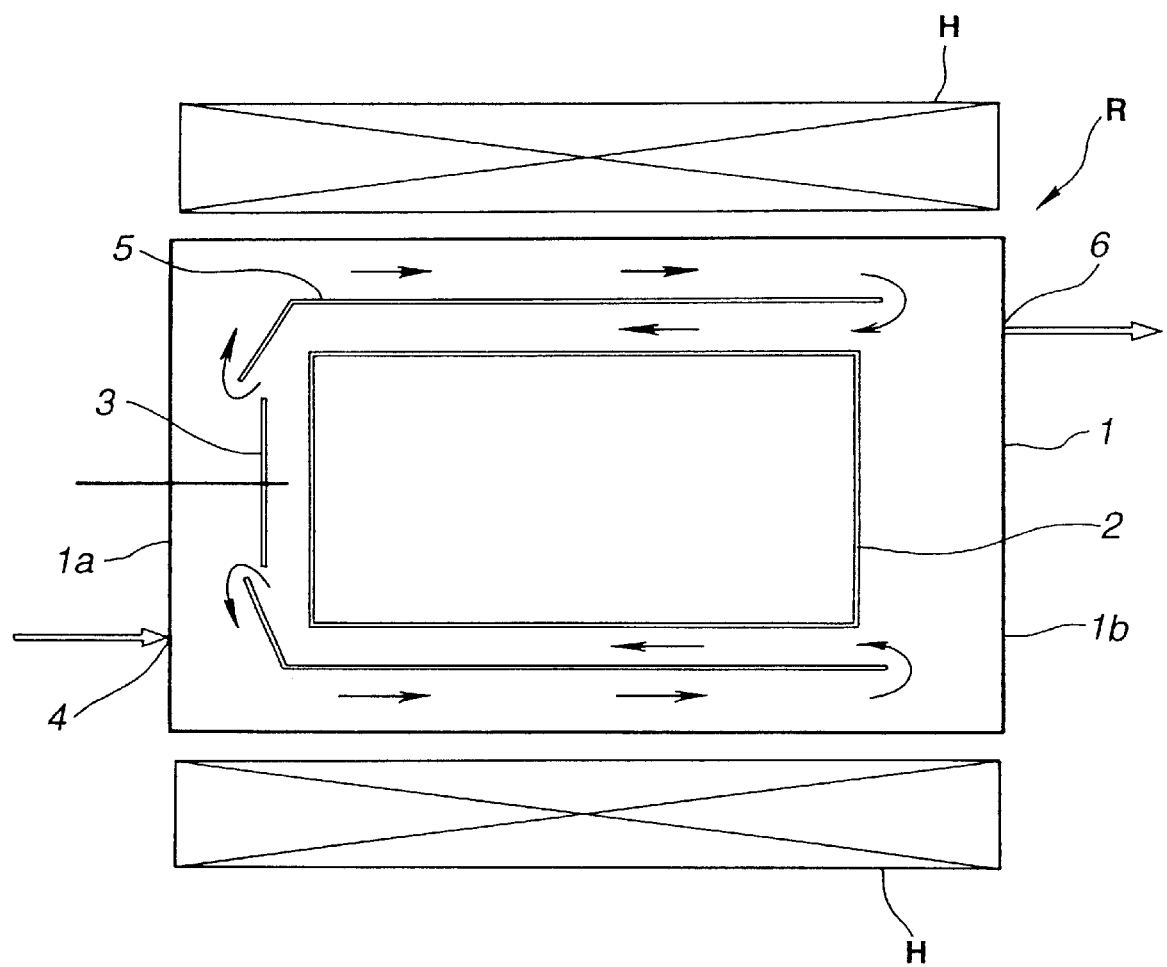

NF₃ TREATING PROCESS

BACKGROUND OF THE INVENTION

1. Field of the Invention

The present invention relates to a process for treating $NF_3$ gas that is useful as a dry etching gas and cleaning gas in processes for producing LSI, TFT, and solar cell and in an electron photographic process.

2. Description of the Invention $NF_3$ is a toxic gas having a TLV of 100 ppm that is extremely stable in air and essentially insoluble in water. In the case of using this substance, it is necessary at all times to remove residual $NF_3$ present in exhaust gas. Since $NF_3$ is extremely chemically stable at temperatures near room temperature and is also insoluble in water, it cannot be processed by ordinary gas absorption processes in its original state. Consequently, the following process has been proposed in Japanese Patent No. 1538007 (Japanese Patent Provisional Publication No. 61-204025), in which $NF_3$ is reacted with a substance that converts $NF_3$ into a fluoride gas that easily reacts with water and alkaline solution, followed by treating the resulting fluoride gas with a normal gas absorption process. The Japanese Patent discloses a process wherein $NF_3$ is reacted with Si, B, W, Mo, V, Se, Te, Ge and their non-oxidizing solid compounds that are used as the converting substance.

Although the above $NF_3$ treatment process is effective for converting $NF_3$ into an easily treated gas compound, a characteristic reactor taking the $NF_3$ into consideration was not proposed with respect to the reactor for reacting and treating a large amount of $NF_3$. Namely, the above Patent only proposes a single flow type of fixed bed reactor as equipment for contacting gaseous $NF_3$ with a solid compound.

The fixed bed reactor described in the present specification refers to a reactor having a cylindrical outer tube in which a fixed bed, filled with a solid compound such as a metal element that reacts with $NF_3$ throughout an ordinary cylindrical reactor, is disposed. The fixed bed is heated as necessary followed by introducing gas from one end of the cylinder, contacting and reacting the gas with a metal element and so forth inside the cylindrical tube, and discharging the gas from the other end of the tube. This form of the reactor is that which has been known since long ago. In addition, various types of $NF_3$ detoxification technologies taking into consideration new reaction systems other than the above reaction system have been disclosed as being disclosed in Japanese Patent Publication No. 2-30731 and Japanese Patent provisional Publication No. 7-155540. In such technologies, the fixed bed reactor of the gas flow type is still used. Thus, the reactors that provide an effective setting for an $NF_3$ detoxification reaction have not yet discovered.

Now, treatment of $NF_3$ gas is accompanied by the generation of extremely large amounts of heat from the reaction. Namely, its standard formation enthalpy is $-127$ kJ/mol ($-42$ kJ per fluorine atom), and in the case of $SiF_4$ gas being obtained as the product of the action of metal Si, for example, since the standard formation enthalpy of $SiF_4$ is $-1615$ kJ/mol ($-404$ kJ per fluorine atom). The difference between the two enthalpies are the amount of heat generated accompanying reaction (362 kJ per fluorine atom), which demonstrates that $NF_3$ detoxification reaction is accompanied by the generation of an extremely large amount of heat. Even though there may be some difference in the amount of heat generated in the case that the other substance than Si such as B or W, or if C is selected as a reacting metal element: however, it is intrinsically a reaction that is accompanied by the generation of a large amount of heat.

In the case of conducting a gas-solid reaction using a reactor or reaction tube of the type in which gas is allowed to flow over a fixed bed, the reaction initially occurs in the zone on the inlet side of the initial reaction tube, and as chemical is consumed, the reaction zone gradually moves to the outlet side. Since the flow of gas inside the reactor is so-called piston flow, there are many cases in which the reaction always occurs in a special location inside the reaction tube in this manner, while other portions of the reaction tube merely fulfill the role of a gas pathway and are not involved in the reaction itself. Moreover, due to the low rate of heat transfer of the fixed bed, it cannot be said to be suited for efficiently discharging the reaction heat generated locally inside the reactor in this manner outside the system.

For these reasons, when an $NF_3$ detoxification reaction is carried out with a fixed bed gas flow system for a reaction that generates a large amount of heat, the local temperature that results from the reaction ends up becoming extremely high. Consequently, the amount of $NF_3$ that be treated per unit time cannot be increased relative to the volume of the reactor.

Moreover, there has been proposed a process in which the concentration of supplied $NF_3$ is diluted with an inert gas (such as $N_2$) for the purpose of lowering the temperature of the formed gas. However, this process increases the volumetric flow of all gas resulting in a shortening of retention time, and therefore is not effective as a means of improving the $NF_3$ treatment rate per reactor volume. Moreover, even if a large reactor is attempted to be designed having a larger $NF_3$ treatment rate, there is a limit on the size of the reaction tube diameter for ensuring heat transfer in the radial direction. Ultimately, in order to provide $NF_3$ treatment volume, a plurality of small diameter reactors must be arranged in parallel, and in any case, fixed bed gas flow systems had the problem of being disadvantageous in terms of equipment cost.

In addition, in the case of using Si, for example, in the reaction between $NF_3$ and Si, a relatively large amount of heat is generated on the order of 1,086 kJ/mol. Consequently, this invites a local temperature rise and overheating in conventional tubular apparatuses of the fixed bed type, thereby placing a limit on the amount (concentration) of $NF_3$ supplied, and the limit of that supplied concentration is 5 vol %. In addition, the actual limit on the tube diameter of a fixed bed system is 150 A (according to Japanese Industrial Standard) corresponding to an outer diameter of 165.2 mm. Namely, it was necessary to accompany treatment of $NF_3$ at 5 NL/min with a diluting gas ($N_2$) at 100 NL/min. For this reason, fixed bed systems are not suited for treatment of highly concentrated $NF_3$ or large amounts of $NF_3$.

In addition, in the case of fixed bed systems, treatment capacity has been observed to decrease when air or oxygen is present. Consequently, there is a need for an $NF_3$ treatment process that allows treatment of highly concentrated $NF_3$, does not result in a decrease in treatment rate even in the presence of, for example oxygen (air) in the $NF_3$, and is able to ensure a certain degree of treatment volume per unit time.

SUMMARY OF THE INVENTION

As a result of conducting earnest studies in consideration of the above-mentioned problems, the inventors of the present invention have found that highly concentrated and large amounts of $NF_3$ gas can be treated by creating a setting for gas flow that prevents local overheating of the fixed portion of a reactor, rapidly transports generated heat to the wall of the reactor with the flow of gas, and provides as rapid a gas flow as possible along the reactor wall to promote transfer of heat between the gas phase and solid wall in the vicinity of the reactor wall, thereby leading to completion of the present invention.

An aspect of the present invention resides in a process for treating $NF_3$, comprising the following step: (a) preparing a first reactor including agitator blades for agitating gas in the first reactor and generating a flow of the gas, and a gas flow guide tube for efficiently circulating and dispersing the gas flow generated by the agitator blades in a space of the first reactor; (b) stationarily placing at least one substance selected from the group consisting of a metal and a metal compound within a first reactor, the metal being at least one metal selected from the group consisting of Si, B, W, Mo, V, Se, Te and Ge, the metal compound being at least one metal compound selected from the group consisting of solid compounds of Si, B, W, Mo, V, Se, Te and Ge; (c) introducing a gas containing $NF_3$ into the first reactor to react the introduced gas with at least one substance of the metal and the metal compound at a temperature ranging from 400 to 900° C. upon operating the agitator blades of the first reactor so as to form a fluoride gas; and (d) capturing the fluoride gas.

The above process may further comprises the steps of (e) connecting a second reactor in series with and at a side downstream of the first reactor, the second reactor having a fixed bed including at least one substance of a metal and a metal compound within a first reactor, the metal being at least one metal selected from the group consisting of Si, B, W, Mo, V, Se, Te and Ge, the metal compound being at least one metal compound selected from the group consisting of solid compounds of Si, B, W, Mo, V, Se, Te and Ge; and (f) introducing gas discharged from the first reactor to the second reactor so as to react the gas with the at least one substance of the metal and the metal compound within a temperature ranging from 400 to 900° C.

Another aspect of the present invention resides in a system for treating $NF_3$. The system comprises a reactor which includes an outer tube into which a gas containing $NF_3$ is supplied. Agitator blades are disposed inside the outer tube for agitating the gas and generating a flow of the gas. A gas flow guide tube is disposed inside the outer tube to efficiently circulate and disperse the gas flow generated by the agitator blades in a space of the outer tube. Additionally, at least one substance selected from the group consisting of a metal and a metal compound, disposed inside the gas flow guide tube. The metal is at least one metal selected from the group consisting of Si, B, W, Mo, V, Se, Te and Ge. The metal compound is at least one metal compound selected from the group consisting of solid compounds of Si, B, W, Mo, V, Se, Te and Ge. Additionally, a heater is disposed outside the outer tube to heat the space inside the outer tube at a temperature ranging from 400 to 900° C.

According to the $NF_3$ treatment process and system of the present invention, gas containing $NF_3$ in a large amount and/or at a high concentration can be adequately removed while performing the treatment process safely without the formation of explosive gas by-products.

BRIEF DESCRIPTION OF THE DRAWING

The FIGURE is a schematic longitudinal sectional view of an example of a horizontal cylindrical reactor used in a $NF_3$ treating process according to the present invention.

DETAILED DESCRIPTION OF THE INVENTION

According to the present invention, a process for treating $NF_3$, comprises the following step: (a) preparing a reactor including agitator blades for agitating gas in the reactor and generating a flow of the gas, and a gas flow guide tube for efficiently circulating and dispersing the gas flow generated by the agitator blades in a space of the reactor; (b) stationarily placing at least one substance selected from the group consisting of a metal and a metal compound within a reactor, the metal being at least one metal selected from the group consisting of Si, B, W, Mo, V, Se, Te and Ge, the metal compound being at least one metal compound selected from the group consisting of solid compounds of Si, B, W, Mo, V, Se, Te and Ge; (c) introducing a gas containing $NF_3$ into the reactor to react the introduced gas with at least one substance of the metal and the metal compound at a temperature ranging from 400 to 900° C. upon operating the agitator blades of the reactor so as to form a fluoride gas; and (d) capturing the fluoride gas.

The above process is performed by a system including a reactor whose one example is shown in the Figure. The reactor R in the Figure is the horizontal cylindrical type and comprises an cylindrical outer tube 1 having an intake-side end wall 1a and an exhaust-side end wall 1b. A tray 2 on which Si granules (treatment agent) are placed is disposed inside the outer tube 1, in which the inside temperature of outer tube is held at 400–900° C. using an external heater H disposed outside the outer tube 1. Gas containing $NF_3$ is supplied through a gas intake port 4 formed in the intake-side end wall 1a, and is sufficiently contacted with the Si by agitating the gas with agitator blades 3 to carry out a decomposition reaction for generating decomposition gas. Under agitation by the agitator blades 3, the decomposition gas and unreacted $NF_3$ are circulated in a direction indicated by arrows in the Figure and dispersed through a generally cylindrical gas flow guide tube 5. The gas flow guide tube 5 is spacedly disposed between the outer housing 1 and the tray 2. The gas which has been subjected to reaction is discharged from a gas exhaust port 6 formed in the exhaust-side end wall 1b.

Since this process allows gas to be more completely mixed than processes of the prior art, it offers the advantage of being able to inhibit local overheating. In this case, it is preferable that the mean flow rate of the circulating gas flow inside the gas flow guide tube 5 be 0.5 m/sec or more, and more preferably within the range of 0.5–3.0 m/sec. If the mean flow rate is less than 0.5 m/sec, the removal of heat generated accompanying the reaction is insufficient resulting in the occurrence of local overheating. Even if the mean flow rate exceeds 3.0 m/sec, the resulting effects of dispersing gas or effects of removing reaction heat are not improved, so that the motive power required for agitation is wasted.

In addition, although varying according to the shape and size of the reactor, it is preferable that the amount of gas introduced into the outer tube 1 is equal to or less than a value (per minute) corresponding to 0.1 times of the internal volume of the outer tube 1 in terms of the volumetric flow as converted from the standard state. If the volumetric flow or introduced gas amount is greater than this, the heat generated in the reaction exceeds heat dissipation resulting in overheating of the reactor if $NF_3$ is highly concentrated at nearly 100%. Conversely, if the $NF_3$ concentration is low at 50% or lower, the retention time of the gas in the reactor is shortened, resulting in a large amount of unreacted $NF_3$.

Moreover, the temperature for carrying out the contact decomposition reaction of the gas to be introduced into the outer tube 1 is preferably within the range of 400–900° C., and optimally within the range of 500–700° C. If the temperature is lower than 400° C., the reaction proceeds slowly and the amount of unreacted $NF_3$ increases. In addition, if the temperature exceeds 900° C., the reaction proceeds too rapidly causing a local reaction which has the risk of damaging the members of the reactor at that portion.

The treatment agent used to be reacted with $NF_3$ in the present invention is preferably Si, B, W, Mo, V, Se, Te, Ge or a non-oxide solid compounds of these metals. Examples of the non-oxide solid compounds of these metals are $Si_3N_4$ and SiC.

There are no particular restrictions on the material of the reactor R used in the present invention provided it is a metal material or oxide-based material having corrosion resistance at high temperatures, in which nickel or nickel alloy is preferable as the metal material. In addition, the shape and dimensions of the reactor R are suitably selected according to the amount of detoxified substance and the required detoxification capacity.

Moreover, in order to carry out $NF_3$ treatment more efficiently, it is preferable to use a process or treatment (first stage using a first stage reactor) in which a content of $NF_3$ of up to several percent is treated with the process of the present invention followed by a secondary treatment (second stage using a second stage reactor) up to 10 ppm or less on $NF_3$ treated in the first stage by a cylindrical reactor of the fixed bed type (piston flow system) filled with the same treatment agent (such as Si) as that in the reactor R. As a result, a large amount of highly concentrated $NF_3$ at a large flow rate can be treated up to the allowed concentration or less.

$SiF_4$ is formed when using, for example, Si or $Si_3N_4$ for the treatment agent in the first or second stage of treatment. The thus formed $SiF_4$ can be treated with an ordinary wet scrubber. The waste liquid that has absorbed $SiF_4$ in the wet treatment with the wet scrubber can be treated with a typical process in which the waste liquid is sent to a treatment tank in a later stage in which, for example, a chemical such as calcium hydroxide is added to the waster liquid. At this time, the F and Si are converted to water-insoluble solids such as $CaF_2$ and $SiO_2$, respectively, followed by recovery by filtration. In addition, since the gas on which the above treatment is performed is detoxified, it can be purged into the atmosphere.

As has been described above, according to the process of the present invention, by reacting a large amount of $NF_3$ with a metal and so forth, absorbing the resulting gaseous fluoride (such as $SiF_4$, $BF_3$, $WF_6$, $MoF_6$ or $GeF_4$) with a wet scrubber and finally converted to a solid in the form of, for example, calcium fluoride, the present invention is able to demonstrate detoxifying effects in which gas containing $NF_3$ is not discharged into the atmosphere.

EXAMPLES

The present invention will be more readily understood with reference to the following Examples in comparison with Comparative Examples; however, these Examples are intended to illustrate the invention and are not to be construed to limit the scope of the invention.

Example 1

A reactor (R) as shown in the FIGURE was prepared including an outer or reaction tube (1) having a diameter of 400 mm and a length of 1,300 mm. The reactor was provided with a tray (2) located inside the outer tube as shown in the FIGURE. A gas flow guide tube (5) was disposed between the outer tube and the tray so that the tray was spacedly located inside the gas flow guide tube as shown in the Figure. 55 Kg of metal silicon were placed on the tray. The reactor had a reaction portion having a volume of 200 liters. The reaction tube was heated to 600° C. by an external heater (H) located outside thereof. $NF_3$ at 5.0 NL/min was supplied from a gas intake port (4) of the reactor into the outer tube. The retention time of the gas in the reactor was 540 seconds. At this time, the gas flow rate of the gas inside the flow guide tube was set to 1.0 m/sec using agitator blades (3) as shown in the FIGURE.

When a portion of the outlet gas from the gas exhaust port was captured and analyzed by a FT-IR (Fourier transform-type infra-red spectroscopy) and a gas chromatography, $NF_3$, $N_2$, $SiF_4$ and $N_2O$ were detected. The $NF_3$ concentration at the gas exhaust port was 2 vol %. The experiment conditions and analysis results are shown in Table 1 in which "Intake gas concentration" is a concentration (vol %)of the gas introduced from the gas inlet port of the reactor; "Outlet gas concentration" is a concentration (vol %) of the gas discharged from the gas exhaust port of the reactor; "Total gas supply volume" is a total volume of the gas supplied from the gas inlet port of the reactor, which are common throughout Examples to Comparative Examples.

Example 2

55 Kg of metal silicon were placed on the tray in the reactor of Example 1 followed by heating the reaction tube to 600° C. using the external heater and treating the $NF_3$ contained in the air. $NF_3$ was supplied at 8.0 NL/min, $N_2$ at 6.4 NL/min and $O_2$ at 1.6 NL/min (total gas supply volume=16.0 NL/min). The gas retention time in the reaction tube was 170 seconds. At this time, the gas flow rate in the gas flow guide tube was set to 1.0 m/sec using the agitator blades.

When a portion of the outlet gas from the gas exhaust port was captured and analyzed by a FT-IR and a gas chromatography, $NF_3$, $N_2$, $O_2$, $SiF_4$ and $N_2O$ were detected. The $NF_3$ concentration was 5 vol %. The experiment conditions and analysis results are shown in Table 1.

Example 3

55 Kg of metal silicon were placed on the tray in the reactor of Example 1 followed by heating the reaction tube to 600° C. using the external heater and treating the $NF_3$ contained in the air. $NF_3$ was supplied at 4.0 NL/min, $N_2$ at 3.2 NL/min and $O_2$ at 1.6 NL/min (total gas supply volume= 8.0 NL/min). The gas retention time in the reaction tube was the same as in Example 1. At this time, the gas flow rate in the gas flow guide tube was set to 1.0 m/sec using the agitator blades.

When a portion of the outlet gas from the gas exhaust port was captured and analyzed by a FT-IR and a gas chromatography, $NF_3$, $N_2$, $O_2$, $SiF_4$ and $N_2O$ were detected. The $NF_3$ concentration was 2 vol %. The experiment conditions and analysis results are shown in Table 1.

Example 4

A nickel vertical cylindrical reactor (latter or second stage reactor) having an inner diameter of 80 mm and a length of 1,050 mm was connected to the gas exhaust port of the reactor in Example 2. Si granules were tightly packed in the latter stage reactor to form a fixed bed in the reactor. The latter stage reactor was heated at 600° C. with the external heater. Exhaust gas from the reactor in Example 2 was introduced into the latter stage reactor having the fixed bed. When a portion of the outlet gas discharged from the latter stage reactor was captured and analyzed by a FT-IR and a gas chromatography, $NF_3$, $N_2$, $O_2$, $SiF_4$ and $N_2O$ were detected. The $NF_3$ concentration was 10 vol %. The experiment conditions and analysis results are shown in Table 1 in which "Intake gas concentration" was a volume of the gas from the gas exhaust port of the reactor in Example 2.

TABLE 1

| | Reactor | Intake gas concentration vol % | | | Total gas supply volume | Retention time | Gas flow guide | Gas flow rate | Outlet gas concentration vol % | | | | |
|---|---|---|---|---|---|---|---|---|---|---|---|---|---|
| | | $NF_3$ | $N_2$ | $O_2$ | NL/min | sec. | tube | m/sec | $NF_3$ | $N_2$ | $O_2$ | $SiF_4$ | $N_2O$ |
| Ex. 1 | Horizontal | 100 | — | — | 5 | 540 | Yes | 1.0 | 2 | 39 | — | 59 | — |
| Ex. 2 | cylinder | 50 | 40 | 10 | 16 | 170 | Yes | 1.0 | 2 | 54 | 3 | 34 | 8 |
| Ex. 3 | | 50 | 40 | 10 | 8 | 340 | Yes | 1.0 | 2 | 52 | 3 | 35 | 8 |
| Ex. 4 | Fixed bed | 2 | 54 | 3 | 17 | — | — | — | <10 ppm | 54 | 3 | 35 | 8 |
| Comp Ex. 1 | Horizontal cylinder | 100 | — | — | 5 | 540 | Yes | 0.2 | 10 | 36 | — | 54 | — |
| Comp Ex. 2 | | 100 | — | — | 5 | 540 | No | 1.0 | 8 | 36 | — | 56 | — |

Note: Reaction in the reactor was made at 600° C. in all cases.

Comparative Example 1

55 Kg of metal silicon were placed on the tray in the reactor in Example 1, followed by heating the reaction tube to 600° C. using the external heater. $NF_3$ was supplied from the gas intake port at 8.0 NL/min. The retention time of gas in the reactor was 540 seconds. The gas flow rate in the gas flow guide tube was set to 0.2 m/sec using the agitator blades.

When a portion of the outlet gas was captured and analyzed by a FT-IR and a gas chromatography, the concentration of $NF_3$ was found to be 10 vol %. The experiment conditions and analysis results are shown in Table 1.

Comparative Example 2

55 Kg of metal silicon were placed on the tray in the reactor which was similar to that of Example 1 with the exception that no gas flow guide tube (5) was provided, followed by heating the reaction tube to 600° C. using the external heater. $NF_3$ was supplied from the gas intake port at 5.0 NL/min. The gas retention time in the reactor was 540 seconds.

When a portion of the outlet gas from the gas exhaust port was captured and analyzed by a FT-IR and a gas chromatography, the concentration of $NF_3$ was found to be 8 vol %. The experiment conditions and analysis results are shown in Table 1.

Comparative Example 3

$NF_3$ was supplied at 5.0 NL/min to the vertical cylinder reactor (having the fixed bed) used as the latter stage reactor in Example 4. The reaction occurred in a confined area near the entrance of the reactor. The reactor walls were damaged after 5 minutes due to accumulation of reaction heat.

As apparent from the above, according to the $NF_3$ treatment process of the present invention, gas containing $NF_3$ in a large amount and/or at a high concentration can be adequately removed while performing the treatment process safely without the formation of explosive gas by-products.

What is claimed is:

1. A process for treating $NF_3$, comprising the following steps:
    preparing a first reactor including an outer tube, agitator blades for agitating gas in the first reactor and generating a flow of the gas, and a gas flow guide tube for efficiently circulating and dispersing the gas flow generated by the agitator blades, said gas flow guide tube being disposed inside said outer tube so as to form an inner space inside said gas flow guide tube and an outer space between the said gas flow guide tube and said outer tube:
    stationarily placing at least one substance selected from the group consisting of a metal and a metal compound within the inner space of said first reactor, the metal being at least one metal selected from the group consisting of Si, B, W, Mo, V, Se, Te and Ge, the metal compound being at least one metal compound selected from the group consisting of solid compounds of Si, B, W, Mo, V, Se, Te and Ge;
    heating the inside of said first reactor to a temperature ranging from 400° to 900° C.:
    introducing a gas containing $NF_3$ into the first reactor;
    operating said agitator blades to generate a flow of the gas containing $NF_3$;
    circulating the gas containing $NF_3$ through the inner and outer spaces in said first reactor to promote reaction of gas containing $NF_3$ with at least one substance of the metal and the metal compound, thereby forming a fluoride gas; and
    capturing the fluoride gas.

2. A process as claimed in claim 1, wherein the preparing step includes preparing the first reactor including a tray on which the at least one substance of the metal and the metal compound is placed, the tray being located in the inner space formed inside the gas flow guide tube, and locating the agitator blades inside the outer tube and at a side upstream of the tray.

3. A process as claimed in claim 1, further comprising the step of causing the gas within the gas f low guide tube to flow at a mean flow rate of 0.5 m/sec or more so as to be circulated and dispersed.

4. A process as claimed in claim 1, further comprising the following steps:

connecting a second reactor in series with and at a side downstream of the first reactor, the second reactor having a fixed bed including at least one substance selected from the group consisting of a metal and a metal compound within a first reactor, the metal being at least one metal selected from the group consisting of Si, B, W, Mo, V, Se, Te and Ge, the metal compound being at least one metal compound selected from the group consisting of solid compounds of Si, B, W, Mo, V, Se, Te and Ge; and introducing gas discharged from the first reactor to the second reactor so as to react the gas with the at least one substance of the metal and the metal compound within a temperature ranging from 400 to 900° C.

* * * * *